US011515948B2

(12) United States Patent
Oh et al.

(10) Patent No.: US 11,515,948 B2
(45) Date of Patent: Nov. 29, 2022

(54) FUNCTION SPLIT STRUCTURE FOR MOBILE CONVERGENCE OPTICAL TRANSMISSION NETWORK AND METHOD OF PROVIDING COORDINATED MULTI-POINT TECHNOLOGY USING THE SAME

(71) Applicant: ELECTRONICS AND TELECOMMUNICATIONS RESEARCH INSTITUTE, Daejeon (KR)

(72) Inventors: Jung-yeol Oh, Sejong-si (KR); Kwang Ok Kim, Jeonju-si (KR); Kyeong Hwan Doo, Daejeon (KR); Han Hyub Lee, Daejeon (KR); Hwan Seok Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/520,370

(22) Filed: Nov. 5, 2021

(65) Prior Publication Data

US 2022/0149953 A1    May 12, 2022

(30) Foreign Application Priority Data

Nov. 10, 2020 (KR) .......................... 10-2020-0149342

(51) Int. Cl.
*H04B 10/61* (2013.01)
*H04B 10/077* (2013.01)

(52) U.S. Cl.
CPC ....... *H04B 10/616* (2013.01); *H04B 10/0775* (2013.01)

(58) Field of Classification Search
None
See application file for complete search history.

(56) References Cited

U.S. PATENT DOCUMENTS 8,824,890 B2    9/2014   Lee et al.
10,567,969 B2 *  2/2020   Iovanna ............... H04W 28/16
(Continued)

FOREIGN PATENT DOCUMENTS

EP      3158824 B1 *   3/2018   ....... H04B 10/25753
WO   WO-2019027711 A *  2/2019   ........... H04B 7/024
WO   WO-2019183020 A1 * 9/2019   .......... H04B 7/0456

OTHER PUBLICATIONS

ITU-T, "5G wireless fronthaul requirements in a passive optical network context", Jul. 2019, ITU-T G-series Recommendations—Supplement 66, 40 pages (Year: 2019).*

(Continued)

*Primary Examiner* — David W Lambert
(74) *Attorney, Agent, or Firm* — LRK Patent Law Firm

(57) ABSTRACT

Disclosed are a function split structure for a mobile convergence optical transmission network and a method of providing coordinated multi-point technology using the same. The mobile convergence optical transmission network may include a centralized unit (CU), a distributed unit (DU) connected to the CU, a transport node (TN) of an optical transmission network connected to the DU via a first interface, an aggregated unit (AU) connected to a transport unit (TU) of the optical transmission network via the first interface, and a radio unit (RU) connected to the AU via a second interface corresponding to a split structure for a lower layer than the first interface.

14 Claims, 5 Drawing Sheets

(56) References Cited

U.S. PATENT DOCUMENTS

| | | | |
|---|---|---|---|
| 11,146,351 B1* | 10/2021 | Xu | H04B 10/2575 |
| 2013/0089336 A1* | 4/2013 | Dahlfort | H04J 14/0282 |
| | | | 398/115 |
| 2018/0316543 A1 | 11/2018 | Hwang | |
| 2019/0109643 A1* | 4/2019 | Campos | H04Q 11/0067 |
| 2019/0273518 A1* | 9/2019 | Wang | H04B 1/38 |
| 2019/0379455 A1* | 12/2019 | Wang | H04B 10/25753 |

OTHER PUBLICATIONS

Xinbo Wang et al., "Joint Allocation of Radio and Optical Resources in Virtualized Cloud RAN with CoMP", IEEE2016.

Daisuke Hisano et al., "Clarification of accommodatable number of functional split base stations in TDM-PON fronthaul", IEICE 2018.

ITU-T, "5G wireless fronthaul requirements in a passive optical network Context", ITU-T G-series Recommendations—Supplement, Switzerland Geneva, 2019.

3GPP, 3rd Generation Partnership Project; Technical Specification Group Radio Access Network; Study on new radio access technology: Radio access architecture and interfaces (Release 14), 3GPP TR 38.801 V14.0.0 (Mar. 2017).

\* cited by examiner

FUNCTION SPLIT STRUCTURE FOR MOBILE CONVERGENCE OPTICAL TRANSMISSION NETWORK AND METHOD OF PROVIDING COORDINATED MULTI-POINT TECHNOLOGY USING THE SAME

CROSS-REFERENCE TO RELATED APPLICATION

This application claims priority to Korean Patent Application No. 10-2020-0149342, filed on Nov. 10, 2020, the entire content of which is hereby incorporated by reference.

BACKGROUND

1. Field of the Invention

One or more example embodiments relate to a function split structure for an optical transmission network accommodating a mobile network.

2. Description of Related Art

Mobile networks have reduced transmission power consumption by reducing the cell size and increasing the density of wireless base stations due to a rapid increase in the number of mobile subscribers, and improved system capacity through frequency reuse. Due to this, the upcoming next-generation mobile network is developing into an ultra-high-density cellular network in which wireless access points are arranged at a high density.

The 4th generation mobile communication network adopted a cloud radio access network (C-RAN) structure that is efficient in terms of performance optimization and cost in order to efficiently manage evolving complexity. A C-RAN is a structure in which only a remote radio head (RRH) is left at the cell site, baseband processing is concentrated in a central office (CO) or at the master cell site to configure a baseband unit (BBU), and the RRH and the BBU are connected via an optical link. Here, the optical link between the RRH and the BBU is referred to as a mobile fronthaul, and an optical link based on common public radio interface (CPRI) was mainly used.

With the evolution of mobile communication technology, an issue of high capacity of the fronthaul in new RAT (NR) has emerged. As massive MIMO and bandwidth increase, CPRI capacity of tens to hundreds of Gbps per RRH is required. Because of this, it became difficult to cover enormous NR fronthaul construction costs with CPRI, which is a PHY-RF split structure. In order to solve the fronthaul capacity/cost issue, it is required to examine various function split structures of the wireless base station.

SUMMARY

Example embodiments provide an optimal function split structure for a wireless base station in order to solve the issue of fronthaul transmission capacity and the issues of performance improvement and implementation complexity of a radio unit (RU) in an optical transmission network accommodating a mobile network.

According to an example embodiment, there is provided a function split structure for a mobile convergence optical transmission network including a centralized unit (CU), a distributed unit (DU) connected to the CU, a transport node (TN) of an optical transmission network connected to the DU via a first interface, an aggregated unit (AU) connected to a transport unit (TU) of the optical transmission network via the first interface, and an RU connected to the AU via a second interface corresponding to a split structure for a lower layer than the first interface.

The AU may include a function corresponding to a PHY upper layer.

The AU may be configured to modulate L2 data received from the TU into a physical layer signal and demodulate a physical layer signal into L2 packet data.

The AU may be configured to collect channel state information (CSI) from a plurality of RUs in order to improve throughput of a user terminal existing in a cell boundary area and perform precoding and channel compensation for coordinated multi-point (CoMP) technology using the collected channel state information.

The DU and TN and the TU and AU may be connected via the first interface corresponding to a MAC-PHY split structure.

The AU and RU may be connected via the second interface corresponding to an intra PHY split structure.

According to an example embodiment, there is provided a function split structure for a mobile convergence optical transmission network including a CU, a DU connected to the CU and to which a MAC layer functional block is allocated, an AU connected to the DU via a TN of an optical transmission network and to which a PHY upper layer functional block is allocated, and an RU connected to the AU and to which a PHY lower layer function block and an RF function block are allocated.

The AU may be configured to modulate L2 data received from a TU of the optical transmission network into a physical layer signal. Reversely, the AU may be configured to demodulate a physical layer signal into L2 packet data.

The AU may be configured to collect CSI from a plurality of RUs in order to improve throughput of a user terminal existing in a cell boundary area and perform precoding and channel compensation for CoMP technology using the collected channel state information.

According to an example embodiment, there is provided a method of providing coordinated multi-point technology performed by an AU of a mobile convergence optical transmission network. The method may include collecting CSI from a plurality of RUs connected to the AU, and precoding data to be transmitted to a user equipment (UE) or performing channel compensation on a received signal based on the collected channel state information. The mobile convergence optical transmission network may include a CU, a DU connected to the CU, a TN of an optical transmission network connected to the DU via a first interface, an AU connected to a TU of the optical transmission network via the first interface, and an RU connected to the AU via a second interface corresponding to a split structure for a lower layer than the first interface.

The AU may include a function corresponding to a PHY upper layer.

The AU may be configured to modulate L2 data received from the TU into a physical layer signal, and vice versa, demodulate a physical layer signal into L2 packet data.

The DU and TN and the TU and AU may be connected via the first interface corresponding to a MAC-PHY split structure.

The AU and RU may be connected via the second interface corresponding to an intra PHY split structure.

Advantageous Effects

According to example embodiments, it is possible to reduce installation and operation costs by increasing multiplexing efficiency by reducing a transmission bandwidth in a fronthaul section through an optimal function split structure for a wireless base station in an optical transmission network accommodating a mobile network.

In addition, according to example embodiments, it is possible to alleviate requirement for delay time of the fronthaul, and improve performance of the user terminal located in the cell boundary area.

In addition, according to example embodiments, it is possible to promote an open ecosystem that is not an exclusive form by reducing the implementation complexity of the radio unit.

DETAILED DESCRIPTION

Hereinafter, example embodiments of the present disclosure will be described in detail with reference to the accompanying drawings.

Figure 1:
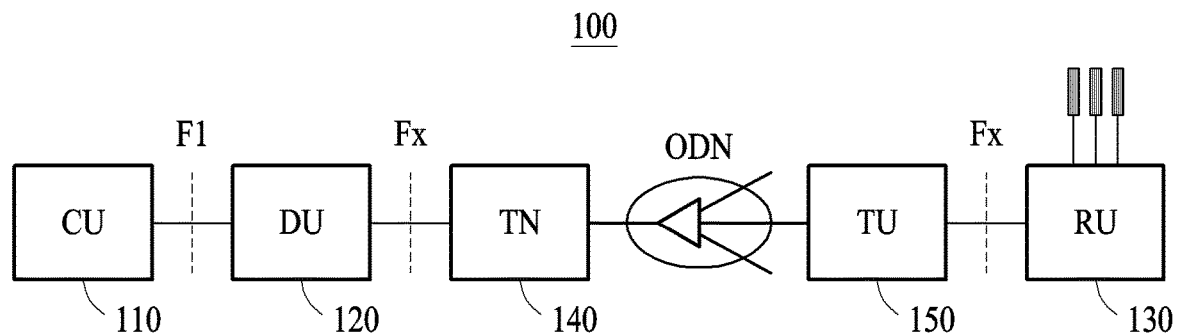
FIG. 1 is a diagram illustrating a mobile convergence optical transmission network in which an optical transmission network is applied to a radio access network (RAN) of a first structure according to an example embodiment.

FIG. 1 is a diagram illustrating a mobile convergence optical transmission network in which an optical transmission network is applied to a radio access network (hereinafter, referred to as RAN) of a first structure according to an example embodiment.

Optical transmission networks are attracting attention as an optimal solution for economically accommodating mobile networks. Two major optical transmission technologies for a passive optical network (PON) among the optical transmission networks are time division multiplexing (TDM) and wavelength division multiplexing (WDM). TDM-PON is a structure in which an Optical Line Terminal (OLT) and multiple Optical Network Units (ONUs) are connected through a Point to Multi-Point (P2MP) distribution network. WDM-PON is a method of transmitting optical signals of multiple wavelengths to a single optical fiber, and has the advantage of greatly increasing the transmission capacity using the existing infrastructure. Recently, as a next-generation PON standard, a WDM/TDM-PON structure, which is a hybrid structure combining these two methods, is adopted to increase the transmission capacity.

Referring to FIG. 1, a mobile convergence optical transmission network 100 introduces function split of a mobile base station RAN to solve the fronthaul capacity and cost issues. A 3-stage structure model including a centralized unit (CU) 110, a distributed unit (DU) 120, and a radio unit (RU) 130 as main function split blocks of the RAN may be provided. For the RAN, all the three functional blocks may be separated according to function split points, the CU 110 and the DU 120 may be integrated, or the DU 120 and the RU 130 may be integrated.

FIG. 1 shows a combining method in the case that an optical transmission network is applied to a mobile fronthaul between the DU 120 and the RU 130 in the mobile convergence optical transmission network 100. More specifically, a transport node (TN) 140 and a transport unit (TU) 150 included in the optical transmission network may be connected to the DU 120 and RU 130 of the RAN, respectively. Here, the TN 140 may correspond to a master node of the side of the DU 120 included in the optical transmission network, and may correspond to an OLT, for example. The TU 150 may correspond to a slave node on the side of the RU 130 included in the optical transmission network, and may correspond to an ONU, for example.

Figure 2:
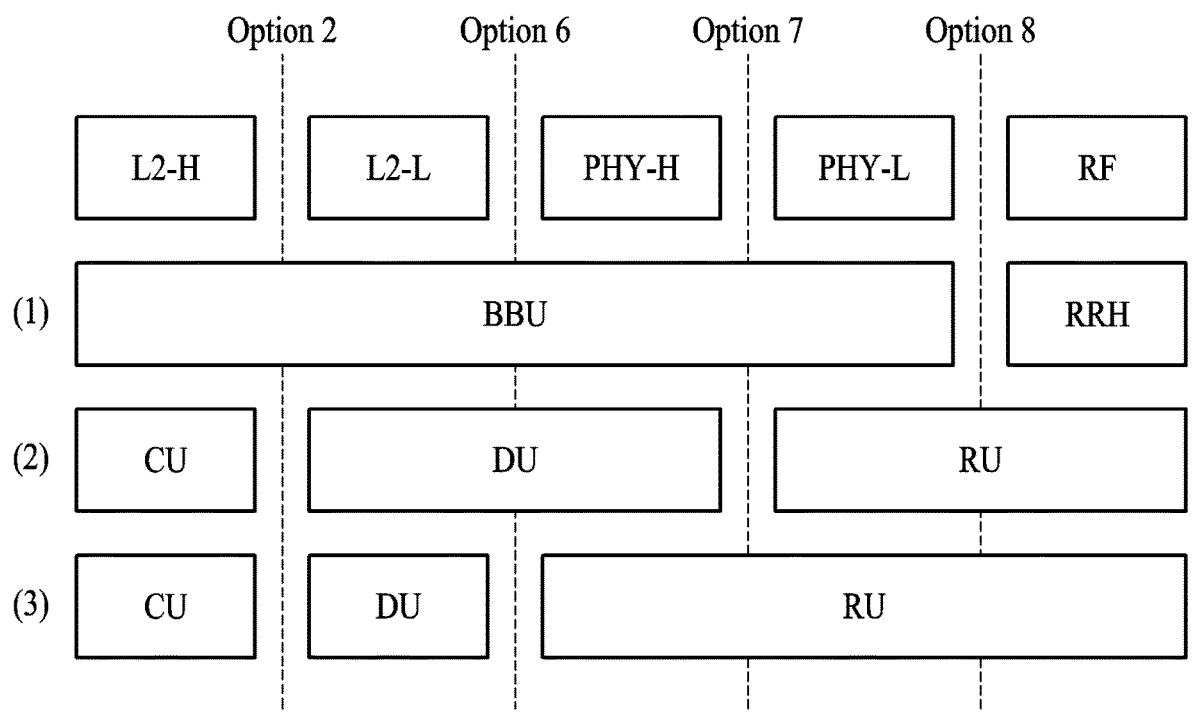
FIG. 2 is a diagram illustrating comparison of function split structures according to related art.

FIG. 2 is a diagram illustrating comparison of function split structures according to a related art.

Referring to FIG. 2, for upper layer function split, which is function split between a CU and a DU, Option 2 for dividing an L2 protocol upper layer (L2-H) and an L2 protocol lower layer (L2-L) may be applied. However, lower layer function split of the DU and an RU adopts a different structure for each institution. The present disclosure may provide the lower layer function split of the DU and RU section to which the mobile fronthaul is applied and which is independent of the upper layer function split between the CU and the DU.

Up to now, various options for function split for the lower layer have been proposed, and Option 8 of function split as shown in (1) of FIG. 2 is a PHY-RF split structure, which is the same as the split structure used in the existing CPRI. The intention of the various function split options is to increase transmission efficiency of the fronthaul by lowering a transmission rate and increasing a statistical multiplexing gain by function split in an upper layer rather than the PHY-RF function split like CPRI.

Option 7 of function split as shown in (2) of FIG. 2 is an intra PHY split structure in which split of the DU and the RU is a split into a PHY upper layer (PHY-H) and a PHY lower layer (PHY-L). The Option 7 structure may significantly reduce the transmission bandwidth required for the fronthaul compared to Option 8 of function split, and may also alleviate the requirement for delay time compared to Option 8. On the other hand, the Option 7 structure has an issue of increasing complexity of the RU because the PHY lower layer should be included in the RU, but also has an advantage of capable of building an open ecosystem in which multiple vendors participate together, rather than an exclusive implementation by a specific vendor. In addition, if multiple RUs are configured for one DU, it becomes possible to implement coordinated multi-point (hereinafter, referred to as CoMP), a technology that can increase throughput of a user terminal existing in a cell boundary area. CoMP is a coordinated multi-point technology, in which neighboring cells cooperate to reduce inter-cell interference by communicating with the same user terminal as well as a serving cell and which improves the throughput of the user terminal existing in the cell boundary area. In order for CoMP to operate, the neighboring cooperative cells share channel state information (CSI) of the user terminal every scheduling period, and based on the shared channel state information of the user terminal, perform joint scheduling and precoding or remove inter-channel interference through channel compensation, thereby increasing the throughput of the user terminal existing at the cell boundary.

Option 6 of function split as shown in (3) of FIG. 2 is a MAC-PHY split structure that separates a MAC layer and a PHY layer of L2 protocol from each other. As the function split point is an upper layer, there is an advantage in that the transmission bandwidth of the fronthaul is greatly reduced and the requirement for delay time is alleviated. Therefore, the Option 6 structure may significantly reduce the transmission bandwidth compared to the Option 7 structure provided in (2) of FIG. 2. More specifically, in the function split structure corresponding to Option 6 of function split, the transmission bandwidth required for the fronthaul is increased to less than 2 times compared to the cell throughput, but in the function split structure corresponding to Option 7 of function split, the transmission bandwidth typically required for the fronthaul is increased by 10 to 30 times compared to the cell capacity.

The function split structure provided by Option 6 of function split significantly reduces the transmission bandwidth required for the fronthaul compared to Option 7 and has the advantage of alleviating the delay time requirement, while there is a disadvantage in that the implementation complexity of the RU increases because the RU includes the entire PHY layer, thereby increasing power consumption and implementation cost. This increase in the implementation complexity of the RU may become an obstacle to building the open ecosystem in which multiple vendors participate rather than the exclusive implementation of the RU by a specific vendor.

In addition, the MAC-PHY split structure corresponding to Option 6 of function split has a disadvantage in that it becomes difficult to implement CoMP that can increase the throughput of the user terminal existing in the cell boundary area.

The reason is that, while multiple base stations should share the PHY layer together in order to use the coordinated multi-point technology, in the case of Option 6 of function split, the PHY layer cannot be shared between cells because the PHY layer belongs to the RU, so that the coordinated multi-point technology cannot be used.

Figure 3:
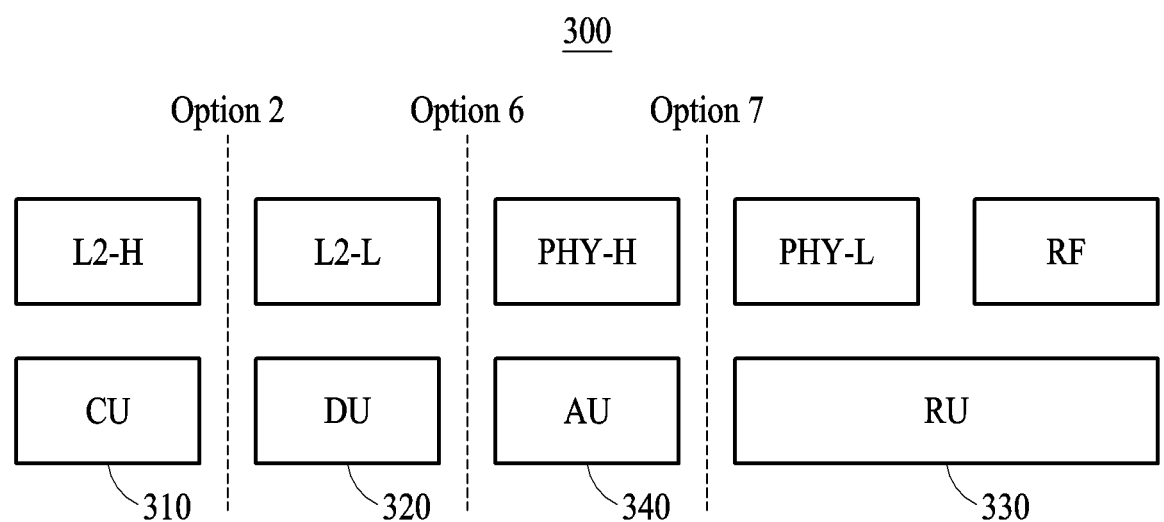
FIG. 3 is a diagram illustrating a 4-stage function split structure model according to an example embodiment.

FIG. 3 is a diagram illustrating a 4-stage function split structure model according to an example embodiment.

More specifically, a mobile convergence optical transmission network 300 is provided with a 4-stage structure model including an aggregated unit (AU) 340 in addition to a centralized unit (CU) 310, a distributed unit (DU) 320, and a radio unit (RU) 330 as main functional blocks of a RAN.

The 4-stage function split structure can provide a method of applying both Option 6 and Option 7 to bring all the advantages of the two split structures. The interface between the DU 320 and the AU 340 may be regarded as a midhaul section and this section uses Option 6 of function split that may greatly reduce the transmission throughput, and the interface between the AU 340 and the RU 330 may be regarded as a fronthaul section and this section may reduce the complexity of the RU 330 and use Option 7 of function split in which CoMP can be implemented.

Figure 4:
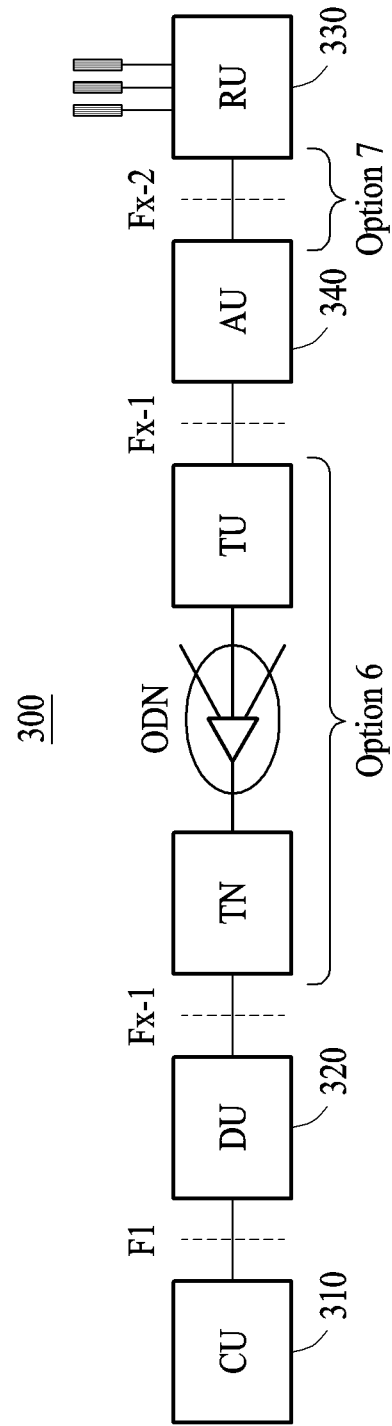
FIG. 4 is a diagram illustrating a mobile convergence optical transmission network in which an optical transmission network is applied to a radio access network (RAN) of a second structure (4-stage function split structure) according to an example embodiment.

FIG. 4 is a diagram illustrating a mobile convergence optical transmission network in which an optical transmission network is applied to a radio access network (hereinafter, referred to as RAN) of a second structure (4-stage function split structure) according to an example embodiment.

A section between the CU 310 and the DU 320 corresponds to the existing upper layer split point, and may be connected via an F1 interface. A mid-hole section between the DU 320 and the AU 340 is defined as an Fx-1 interface, and Option 6 of function split may be applied. The Fx-1 interface is distributed over an optical distribution network (ODN) to a remote location as an optical transmission network. Further, an Fx-2 interface is defined between the AU 340 and the RU 330, and the structure of Option 7 of function split may be applied. In other words, the RU 330 in a short distance may be connected via a high-speed digital interface. The AU 340 may serve as a PHY upper layer, and may perform precoding and channel compensation for a CoMP function.

Figure 5:
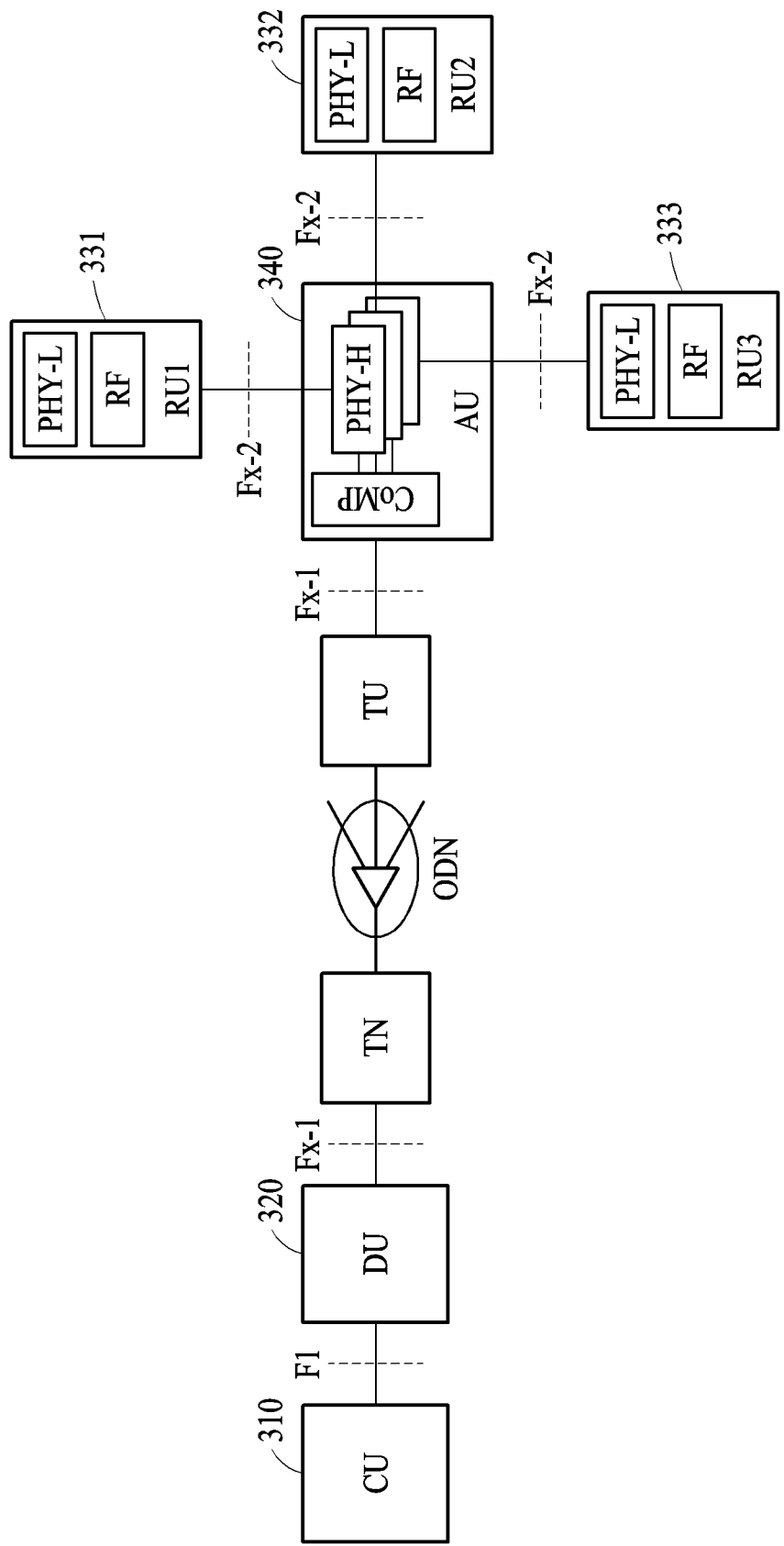
FIG. 5 is a diagram illustrating a structure for accommodating multiple RUs in a RAN of a 4-stage function split structure model according to an example embodiment.

FIG. 5 is a diagram illustrating a structure for accommodating multiple RUs in a RAN of a 4-stage function split structure model according to an example embodiment.

Referring to FIG. 5, in the mobile convergence optical transmission network 100, Option 6 of function split may be applied for an Fx-1 midhaul interface, and Option 7 of function split may be applied for an Fx-2 fronthaul interface, as mentioned above. As mentioned above, in the case that Option 6 of function split is applied to the midhaul interface, the transmission bandwidth required for the fronthaul may be greatly reduced, so that the optical transmission network has the advantage of accommodating more RUs 331-333. Accordingly, the functional block of the AU 340 may be configured as a functional block having multiple PHY upper layers, and as a result, the CoMP implementation becomes possible by sharing the PHY upper layers of the multiple RUs 331-333. The AU 340 may accommodate the multiple RUs 331-333 via the Fx-2 fronthaul interface with a short-range high-speed interface. The RUs 331-333 used in this case may be implemented with low power and low cost by establishing the open ecosystem in which several vendors participate together.

Figure 6:
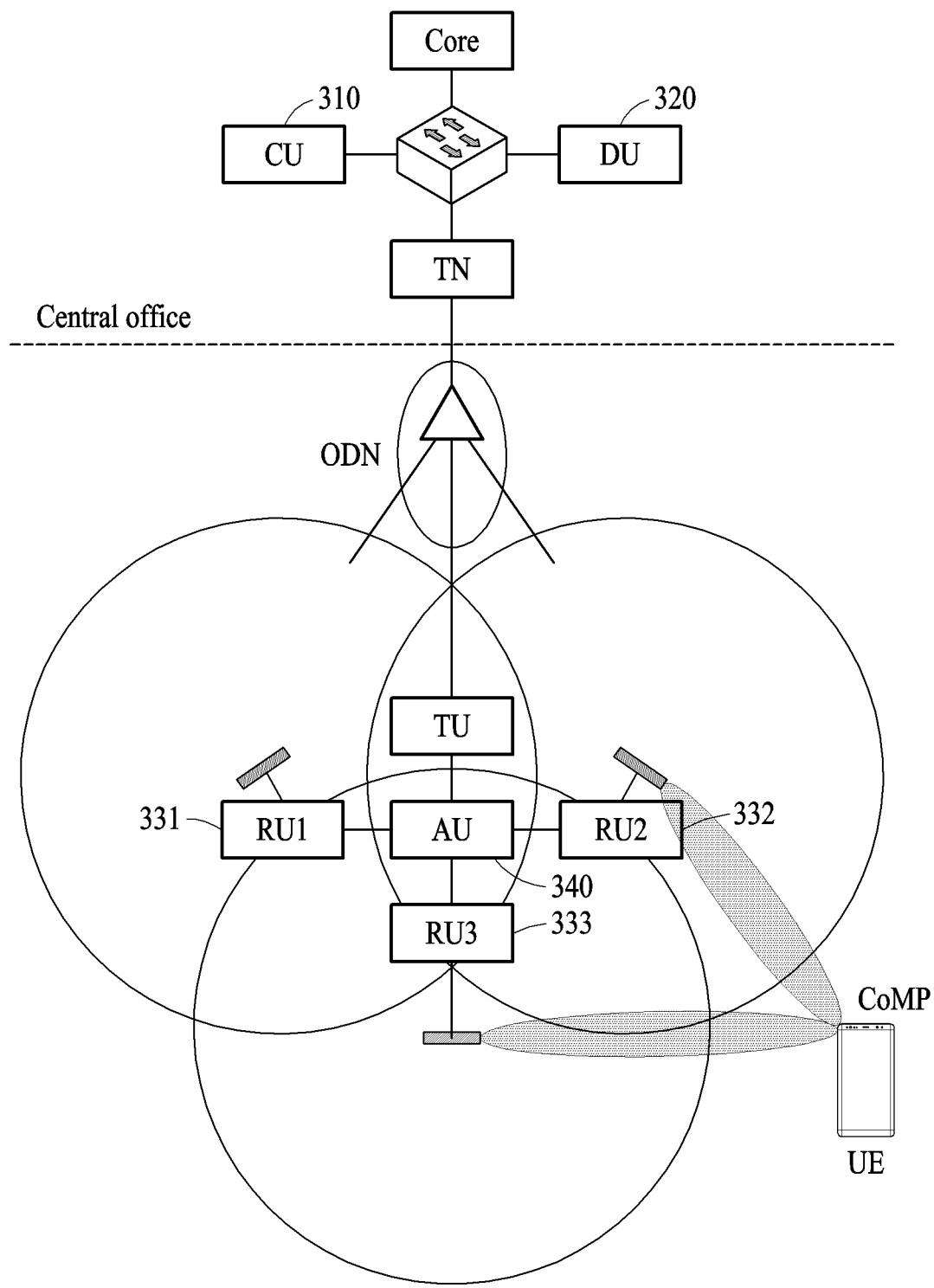
FIG. 6 is a diagram illustrating an example of an intra-site CoMP scenario by using multiple RUs in a RAN of a 4-stage function split structure model according to an example embodiment.

FIG. 6 is a diagram illustrating an example of an intra-site CoMP scenario by using multiple RUs in a RAN of a 4-stage function split structure model according to an example embodiment.

First, the AU 340 may collect the channel state information from a plurality of RUs 330 by performing the role of the PHY-H. In addition, the AU 340 may precode data to be transmitted to a user equipment (UE) based on the collected channel state information and perform channel compensation on the received data.

As described above, the mobile convergence optical transmission network 300 may communicate with the same user terminal not only for the serving cell but also for geographically separated neighboring cells or sectors to share the channel state information and cooperate with them, thereby increasing the throughput of the user terminal located at the cell boundary.

The methods according to example embodiments may be embodied as a program that is executable by a computer and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM). A processor and a memory may be supplemented by, or integrated into, a special purpose logic circuit.

Also, non-transitory computer-readable media may be any available media that may be accessed by a computer and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

The invention claimed is:

1. A function split structure for a mobile convergence optical transmission network, comprising:
   a centralized unit (CU);
   a distributed unit (DU) connected to the CU;
   a transport node (TN) of an optical transmission network connected to the DU via a first interface corresponding to one function split;
   an aggregated unit (AU) connected to a transport unit (TU) of the optical transmission network via the first interface; and
   a radio unit (RU) connected to the AU via a second interface corresponding to another function split for a lower layer than the first interface,
   wherein the two different function splits are applied between the DU and the RU with the AU interposed therebetween, the one of the two function splits being applied to the first interface between the DU and the AU, and the other function split being applied to the second interface between the AU and the RU.

2. The function split structure of claim 1, wherein the AU comprises a function corresponding to a PHY upper layer.

3. The function split structure of claim 2, wherein the AU is configured to modulate Layer 2 (L2) data received from the TU into a physical layer signal and demodulate a physical layer signal into L2 packet data.

4. The function split structure of claim 2, wherein the AU is configured to collect channel state information (CSI) from a plurality of RUs in order to increase throughput of a user terminal existing in a cell boundary area and perform precoding and channel compensation for coordinated multipoint (CoMP) technology using the collected channel state information.

5. The function split structure of claim 1, wherein the DU and the TN are connected to each other via the first interface corresponding to a MAC-PHY split structure, and the TU and the AU are connected to each other via the first interface corresponding to the MAC-PHY split structure.

6. The function split structure of claim 1, wherein the AU and the RU are connected to each other via the second interface corresponding to an intra PHY split structure.

7. A function split structure for a mobile convergence optical transmission network, comprising:
   a centralized unit (CU);
   a distributed unit (DU) connected to the CU and to which a MAC layer functional block is allocated;
   an aggregated unit (AU) connected to the DU via a transport node (TN) of an optical transmission network and to which a PHY upper layer functional block is allocated; and
   a radio unit (RU) connected to the AU and to which a PHY lower layer function block and an RF function block are allocated,
   wherein two different function splits are applied between the DU and the RU, the AU being interposed between the DU and RU.

8. The function split structure of claim 7, wherein the AU is configured to modulate Layer 2 (L2) data received from a transport unit (TU) of the optical transmission network into a physical layer signal and demodulate a physical layer signal into L2 packet data.

9. The function split structure of claim 7, wherein the AU is configured to collect channel state information (CSI) from a plurality of RUs in order to increase throughput of a user terminal existing in a cell boundary area and perform precoding and channel compensation for coordinated multi-point (CoMP) technology using the collected channel state information.

10. A method of providing coordinated multi-point technology performed by an aggregation unit (AU) of a mobile convergence optical transmission network, the method comprising:
  collecting channel state information (CSI) from a plurality of radio units (RUs) connected to the AU; and
  precoding data to be transmitted to a user equipment (UE) and performing channel compensation on a received signal based on the collected channel state information,
  wherein the mobile convergence optical transmission network comprises:
  a centralized unit (CU);
  a distributed unit (DU) connected to the CU;
  a transport node (TN) of an optical transmission network connected to the DU via a first interface;
  the aggregated unit (AU) connected to a transport unit (TU) of the optical transmission network via the first interface; and
  the plurality of radio units (RUs) connected to the AU via a second interface corresponding to a split structure for a lower layer than the first interface.

11. The method of claim 10, wherein the AU comprises a function corresponding to a PHY upper layer.

12. The method of claim 11, wherein the AU is configured to modulate Layer 2 (L2) data received from the TU into a physical layer signal and demodulate a physical layer signal into L2 packet data.

13. The method of claim 10, wherein the DU and the TN are connected to each other via the first interface corresponding to a MAC-PHY split structure, and the TU and the AU are connected to each other via the first interface corresponding to the MAC-PHY split structure.

14. The method of claim 10, wherein the AU and each of the RUs are connected to each other via the second interface corresponding to an intra PHY split structure.

* * * * *